US007937068B2

(12) United States Patent
Hogberg et al.

(10) Patent No.: US 7,937,068 B2
(45) Date of Patent: May 3, 2011

(54) EMERGENCY DISPATCH MANAGEMENT AND PRIORITIZATION OF COMMUNICATION RESOURCES

(75) Inventors: Shawn W. Hogberg, Chandler, AZ (US); Daniel R. Tayloe, Phoenix, AZ (US)

(73) Assignee: Motorola Solutions, Inc., Schaumburg, IL (US)

( * ) Notice: Subject to any disclaimer, the term of this patent is extended or adjusted under 35 U.S.C. 154(b) by 880 days.

(21) Appl. No.: 11/844,022

(22) Filed: Aug. 23, 2007

(65) Prior Publication Data

US 2009/0054029 A1 Feb. 26, 2009

(51) Int. Cl.
*H04M 11/04* (2006.01)
(52) U.S. Cl. .................. 455/404.2; 455/404.1; 455/521
(58) Field of Classification Search .................. 455/403, 455/404.1–2, 422.1, 435.1, 456.1–3, 456.5, 455/521; 340/906, 988
See application file for complete search history.

(56) References Cited

U.S. PATENT DOCUMENTS

| 5,025,254 | A | | 6/1991 | Hess |
| 5,596,625 | A | | 1/1997 | LeBlanc |
| 5,771,459 | A | * | 6/1998 | Demery et al. ............... 455/517 |
| 5,873,040 | A | | 2/1999 | Dunn et al. |
| 6,192,232 | B1 | | 2/2001 | Iseyama |
| 6,493,649 | B1 | * | 12/2002 | Jones et al. .................... 702/150 |
| 6,914,896 | B1 | | 7/2005 | Tomalewicz |
| 7,130,638 | B2 | | 10/2006 | Chen et al. |
| 7,158,803 | B1 | | 1/2007 | Elliott |
| 7,218,619 | B2 | * | 5/2007 | Koo et al. ...................... 370/329 |
| 7,327,280 | B2 | * | 2/2008 | Bachelder et al. ............ 340/906 |
| 2005/0003797 | A1 | * | 1/2005 | Baldwin .................... 455/404.1 |

FOREIGN PATENT DOCUMENTS

| KR | 1020010025941 A | 4/2001 |
| KR | 1020040092206 A | 11/2004 |

* cited by examiner

*Primary Examiner* — CongVan Tran
(74) *Attorney, Agent, or Firm* — Steven A. May; Anthony P. Curtis

(57) ABSTRACT

A method and system for adaptively allocating shared communication resources in response to an emergency event are disclosed herein. In one embodiment, the method includes identifying a response zone 115 associated with an emergency event and dispatching emergency responders 114, 116, and 118 having communication devices 234a-234m to the response zone 115. The dispatching procedure includes adjusting access of the emergency responder communication devices to shared communications resources. Adjusting access to shared communication resources includes identifying one or more of the emergency responder communication devices to be dispatched to the identified response zone and specifying a quality of service (QoS) priority level of at least one of the identified emergency responder communication devices. Adjusting access to shared communication resources further includes specifying a QoS priority level for communication devices located within the identified response zone.

19 Claims, 6 Drawing Sheets

EMERGENCY DISPATCH MANAGEMENT AND PRIORITIZATION OF COMMUNICATION RESOURCES

BACKGROUND OF THE INVENTION

1. Technical Field

The present invention relates generally to management of resources in communication networks, and in particular to a method and system for enabling emergency dispatch control of communication resources in accordance with emergency event driven criteria.

2. Description of the Related Art

Allocation and adjustment of communication resources during a crisis is increasingly recognized as a critical emergency management tool. For an emergency occurring at a particular location or covering a particular area, it is important to enable communications conveying accurate and comprehensive field assessment information to ensure timely and adaptive allocation of remedial resources. Such emergencies may include the occurrence or aftermath of manmade or natural disasters such as vehicle accidents, explosions, fires, hurricanes, tornadoes, earthquakes, etc.

Conventional emergency communication resource allocation/management techniques includes specialized radio bands such as reserved for and used by police and fire departments. Implementation of such channel/bandwidth reservation techniques does not adequately address the needs of potentially large numbers of emergency responders in response to an emergency event that may span a substantial area in terms of the actual disaster site and/or the location(s) from and to which emergency responders must traverse.

SUMMARY OF THE INVENTION

A method and system for adaptively allocating shared communication resources in response to an emergency event are disclosed herein. In one embodiment, the method includes identifying a response zone associated with an emergency event and dispatching emergency responders having communication devices to the response zone. The dispatching procedure includes adjusting access of the emergency responder communication devices to shared communications resources. Adjusting access to shared communication resources includes identifying one or more of the emergency responder communication devices to be dispatched to the identified response zone and specifying a quality of service (QoS) priority level of at least one of the identified emergency responder communication devices. Adjusting access to shared communication resources further includes specifying a QoS priority level for communication devices located within the identified response zone.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
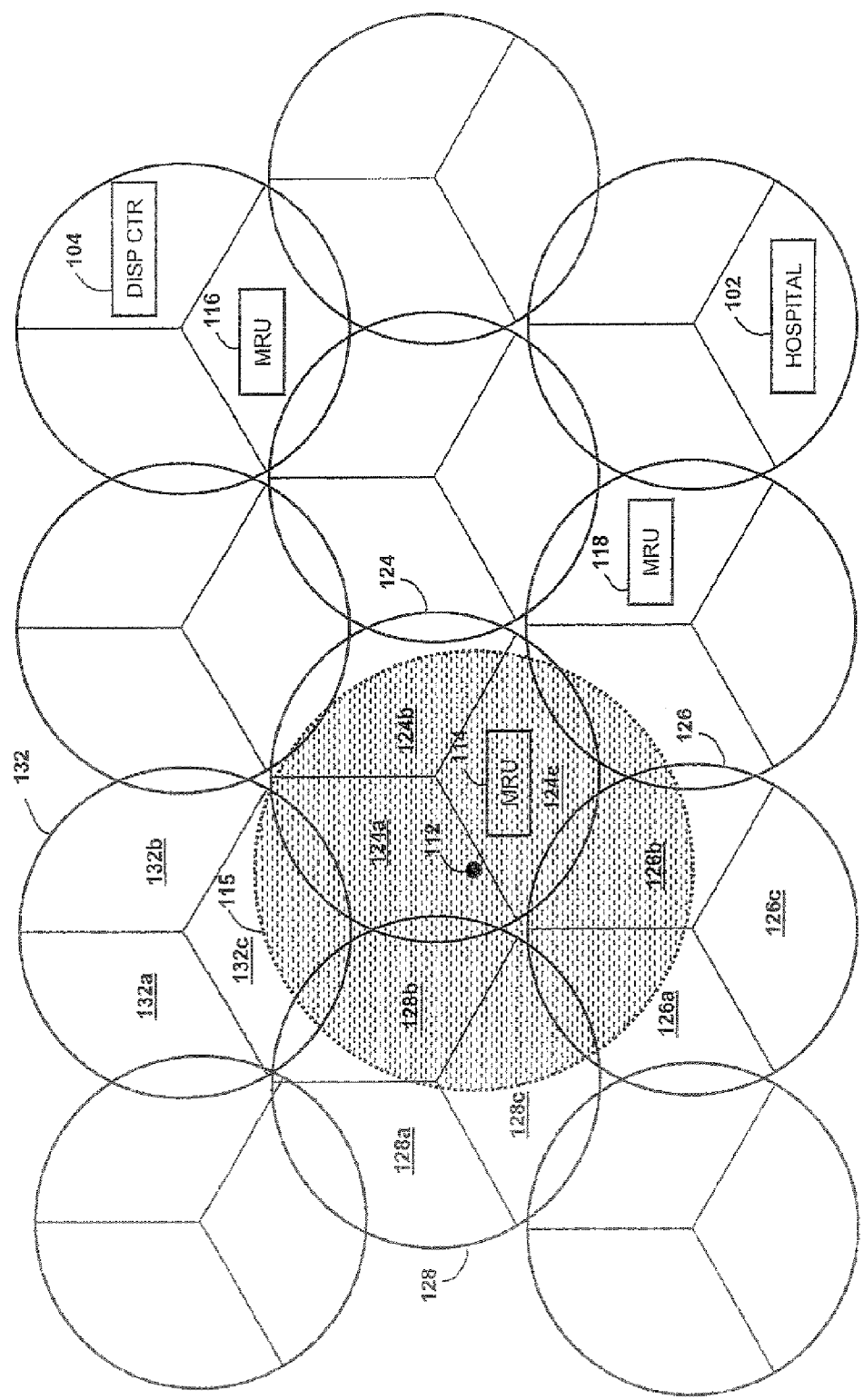
FIG. 1 schematically illustrates a portion of a wireless network coverage area showing coverage areas in which an emergency event may occur and over which emergency responders may traverse.

In the following detailed description of illustrative embodiments, specific illustrative embodiments by which the invention is practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and equivalents thereof.

The figures described below are provided as examples within the illustrative embodiment(s), and are not to be construed as providing any architectural, structural or functional limitation on the present invention. The figures and descriptions accompanying them are to be given their broadest reading including any possible equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific parameter names are for example only and not meant to imply any limitations on the invention. The invention may thus be implemented with different nomenclature/terminology utilized to describe the parameters herein, without limitation.

The present invention is generally directed to managing quality of service (QoS) policies and profiles for emergency responder communications devices that utilize wireless communication systems. With reference now to the figures, FIG. 1 schematically illustrates a portion of a wireless network coverage area showing coverage areas in which an emergency event may occur and over which emergency responders may traverse. Many variations of wireless communication systems are known in the art including land mobile radio, cellular radiotelephone (inclusive of analog cellular, digital cellular, personal communication systems (PCS) and wideband digital cellular systems), and other communication system types. The exemplary depicted embodiment comprises a cellular coverage area included within a cellular radiotelephone communication system. The coverage area includes multiple cells 124, 126, 128, and 132, with each cell divided into three sectors as shown. For example, cell 124 is divided into sectors 124a, 124b, and 124c, and cells 126, 128, and 132 are similarly divided. The depicted cellular coverage area is exemplary of the structure utilized by cellular wireless telephony systems to implement "handoffs" which maintain established communication connections while a mobile communication device moves within and between coverage cells.

Within the depicted cellular coverage area is an emergency dispatch center 104 in communicative contact with multiple mobile response units (MRUs) 114, 116, and 118. Emergency dispatch center 104 represents a device, unit, or institution containing dispatch personnel and data processing and communications equipment for handling and processing emergency calls. Included among the tasks handled by dispatch center 104 are receiving and processing emergency call messages, tracking emergency responder vehicles, and recording and otherwise processing emergency event related information. Dispatch center 104 may handle calls and coordinate response activities for one or more different types of responders (depicted in FIG. 1 as MRUs 114, 116, and 118) including police and fire department personnel, emergency medical service providers, evacuation transport providers, etc. The emergency responders utilize dispatch services of dispatch center 104 to send/relay information and coordinate emergency response operations.

In the depicted embodiment, dispatch center 104 has received an indication of an emergency event, such as via an emergency call placed on a standard public safety line such as 9-1-1. The emergency event is reported to have occurred at the location identified in FIG. 1 as point 112 within sector 124a of coverage cell 124. Responsive to receiving a message indicating the emergency event, a human and/or automated dispatcher within dispatch center 104 dispatches MRUs 114, 116, and 118 to the scene of the reported emergency event at location 112. FIG. 1 further illustrates a hospital 102 located in the depicted coverage area to which victims injured during or in the aftermath of the emergency event may be transported by one or more of MRUs 114, 116, and 118.

The present invention provides a system and method for adaptively allocating communication resources shared among emergency responders or among emergency responders and non-emergency users in response to an emergency event such as that shown in FIG. 1. Namely, and as depicted and explained in further detail with reference to FIGS. 2-6, the present invention provides a dispatch-initiated and coordinated mechanism that dynamically adjusts accessibility to communication resources in association with emergency dispatch such as that shown in FIG. 1.

As depicted and explained in further detail below with reference to FIG. 2, communication cells such as those depicted in FIG. 1 are typically comprised of one or more base transceiver stations coupled to one or more base station controllers (BSCs) to form a radio access network (RAN). BSCs may, in turn, be coupled to an access gateway that provides a connection between the RAN and an external network, such as a Public Switched Telephone Network (PSTN), as well as interconnection to other RANs. Each base transceiver station provides communication services to a mobile communication device located in a coverage area serviced by the base transceiver station via a communication resource that includes a forward link for transmitting signals to, and a reverse link for receiving signals from, the mobile communication device.

Figure 2:
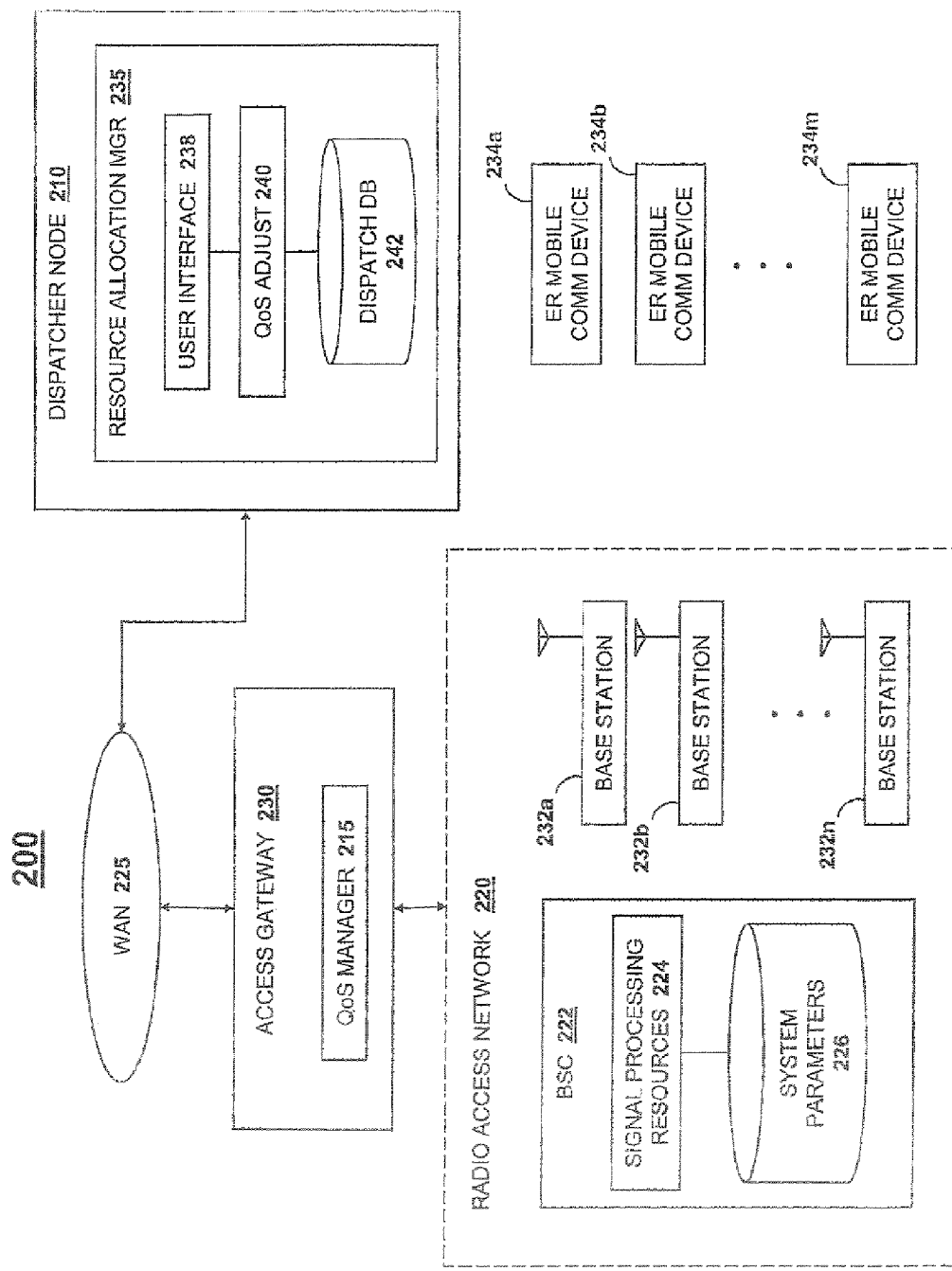
FIG. 2 is a high-level block diagram showing an emergency response communication system in accordance with one embodiment of the present invention.

Referring to FIG. 2, there is depicted a high-level block diagram showing an emergency response communication (ERC) system 200 in accordance with one embodiment of the present invention. As shown in the depicted embodiment, ERC system 200 provides wireless network connectivity between a dispatcher node 210 and multiple emergency response (ER) mobile communication devices 234a-234m. Dispatcher node 210 contains dispatch interface logic that is communicatively coupled to a RAN 220 via a wide area network (WAN) 225 and an access gateway 230. RAN 220 comprises multiple base transceiver stations 232a-232n that provide the air interface links with the ER mobile communication devices 234a-234m. In the exemplary embodiment, access gateway 230 supports various packet data session functions for a multiple-access technology such as 3GPP Long Term Evolution (LTE), and thus provides suitable interface connectivity between RAN 220 and packet switched nodes (not depicted) within WAN 225.

Communicatively coupled to access gateway 230 within RAN 220 is a BSC 222 that generally comprises signal processing resources 224, which may be implemented as one or more mid-range computer systems, and a system database 226. BSC 222 controls the operation of base transceiver stations 232a-232n in accordance with system control parameters stored in system database 226. In accordance with the embodiments depicted in FIG. 2 and FIG. 1, the wireless coverage provided by base transceiver stations 232a-232n includes the cellular coverage area depicted by the cells and sectors shown in FIG. 1. In such a configuration, the ER mobile communication devices 234a-234m preferably comprise devices such as hand-held and vehicle mounted communication devices. Such devices may support voice, video, or other types of real-time data transmission such as hand-held computers, radios, video cameras and monitors, and other such devices. Such communication devices may be contained in or affixed to emergency vehicles such as ambulances and fire trucks such as represented in FIG. 1 by MRUs 114, 116, and 118. One or more of ER mobile communication devices 234a-234m may also be hand-carried by emergency personnel that may be transported to the emergency scene by the MRUs.

ER mobile communication devices 234a-234m are readily transported such as via MRUs 114, 116, and 118 or hand-carried across different service coverage areas such as those maintained by RAN 220 and transmit and receive calls, pages, data and control messages over-the-air with base transceiver stations 232a-232n. Although the present invention is described below primarily with reference to mobile communication terminals such as mobile communication devices 234a-234m, the present invention may also be applicable to wireless local loop (WLL) implementations in which the end-user communication devices are generally fixed such as in building structures.

With continued reference to FIG. 2, BSC 222, in conjunction with base transceiver stations 232a-232n, allocates downlink channels over which data is communicated from base transceiver stations 232a-232n to ER mobile communication devices 234a-234m. Such downlink channels may carry traffic, pilot signals, and overhead information. Reverse, or uplink channels, are utilized to communicate data from ER mobile communication devices 234a-234m to base transceiver stations 232a-232n, and, like the downlink channels, carry both traffic and signaling.

ERC system 200 provides a data processing and communications/network infrastructure by which a dispatcher at dispatcher node 210 can respond to emergency calls by alerting and dispatching MRUs that carry communication devices such as mobile communication devices 234a-234m. In such circumstances, such as those described above with reference to FIG. 1 in which dispatch center 104 dispatches multiple MRUs 114, 116, and 118 responsive to an emergency call, reliable communications among emergency responders and between the responders and other emergency support institutions such as hospitals is critical to ensure timely and effective responses. The present invention provides a method and system for dynamically managing and adjusting allocation of communication resources, such as channels and carriers, to wireless communications devices dispatched to and from an emergency response zone.

In a preferred embodiment, and as depicted and explained with reference to the figures, the dispatch-managed communication resource allocation comprises managing Quality of Service (QoS) profiles and policies of wireless communication devices used by emergency responders. As known in the art, QoS is a technique for managing heterogeneous traffic flows by classifying the services according to the priorities of the users or applications for particular available bandwidths. QoS management tools include control mechanisms that provide different priority to different users or data flows, or guarantee a specified level of performance to a data flow in accordance with requests from the application program. QoS management enables a network to provide better service to selected traffic over various technologies including both wireless and wireline networks.

In accordance with the present invention and with continued reference to FIG. 2, ERC system 200 includes features that enable dispatcher-controlled dynamic adjustment of QoS policies and profiles for ER mobile communication devices 234a-234m. Such features leverage dispatch center functions with the communications resource allocation provided by RAN 220 to enable dispatch-managed adjustment of communications resources to field devices such as ER mobile communication devices 234a-234m.

Specifically, dispatcher node 210 comprises data and dispatch interface logic including a resource allocation manager 235 that contains logic modules, instructions and data for providing a dispatch interface, such as that depicted and described below with reference to FIG. 3, for enabling a dispatcher to adaptively allocate communication resources to emergency responder communication devices. Resource allocation manager 235 generally comprises and integrates a user interface 238, a QoS adjust module 240, and a dispatch database 242. User interface 238 preferably comprises a graphical user interface (GUI) such as that shown in FIG. 3 that accommodates and facilitates dispatcher entry of data required to implement QoS adjustment decisions. User interface 238 receives user input that is subsequently processed by QoS adjust module 240. QoS adjust module 240 processes user input received via user interface 238 in conjunction with data retrieved from dispatch database 242 to generate a QoS allocation message or request that is sent to a QoS manager 215 within access gateway 230 as explained below with reference to FIGS. 3-6.

Figure 3:
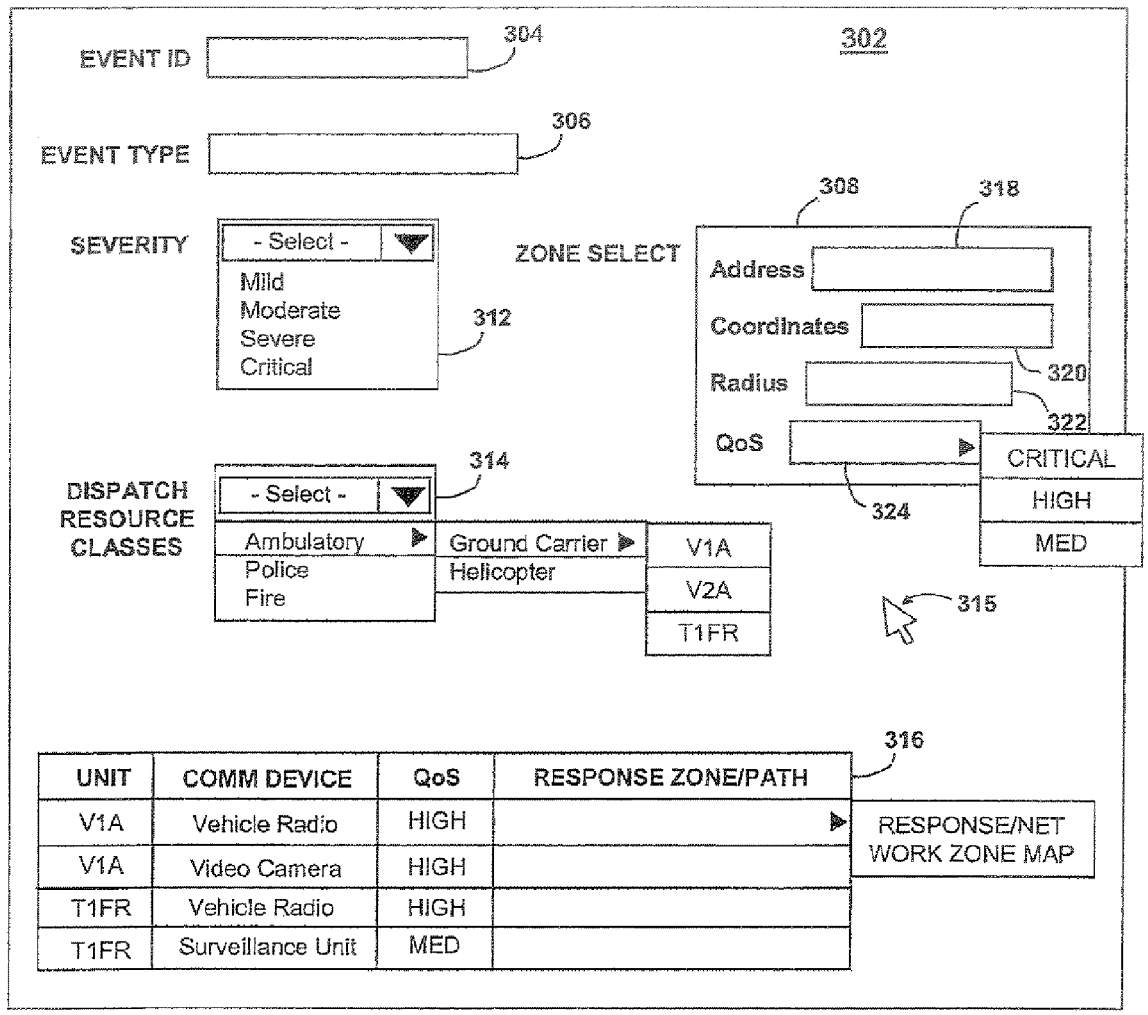
FIG. 3 depicts an exemplary graphical user interface that may be utilized for specifying dispatch QoS management parameters in accordance with one embodiment of the present invention.

Referring to FIG. 3, there is depicted an exemplary QoS management GUI 300 that may be utilized for specifying dispatch QoS management parameters in accordance with one embodiment. GUI 300 is representative of a dispatcher user interface such as user interface 238 depicted in FIG. 2. As shown in FIG. 3, GUI 300 is contained within the active operating environment of a display window 302 containing several selectable icon and data entry field objects. In a preferred embodiment, a user-controlled pointing device (not depicted) controls an on-screen pointer object 315 for selecting/activating the various objects and data entry fields contained within display window 302.

The objects and fields contained within display window 302 include EVENT_ID and EVENT_TYPE data entry fields 304 and 306. The EVENT_ID field 304 provides a dispatcher selectable data entry field in which an identifying name, label, or code may be entered in association with a specified emergency call or event. The EVENT_TYPE field 306 provides a selectable field for receiving dispatcher entry of a descriptor that classifies or otherwise categorizes the event named in the EVENT_ID field 304 in accordance with field characteristics that may be shared across different event instances. Examples of event type classifications that may be entered into EVENT_TYPE field 306 include "FIRE," "FLOOD," "VEHICLE ACCIDENT," "CHEMICAL RELEASE," etc.

GUI 300 further includes a SEVERITY data entry object 312 that provides a selectable field for receiving dispatcher entry of an event severity indicator. In the depicted example, SEVERITY object 312 provides menu-listed severity description options from which the dispatcher can select. A zone select object 308 is provided to enable the dispatcher to enter location description data for an event described in fields 304, 306, and 312. Zone select object 308 includes an ADDRESS entry field 318 and a COORDINATES entry field 320 that can be used individually or in combination to specify a particular location at which the named and described event is reported to have occurred. Zone select object 308 further includes a RADIUS field 322 into which the dispatcher may enter a specified radial distance from the point specified by fields 318 and/or 320. The radial distance entered into RADIUS field 322 defines an emergency response zone containing and surrounding the event site and in which emergency responders are likely to be positioned and traverse across. Such an emergency response zone is illustrated in FIG. 1 as emergency response zone 115 which encompasses event site 112 and a surrounding adjacent area within the cellular coverage area.

In association with RADIUS field 322 which defines the emergency response zone or area is a QoS entry object 324 which receives dispatcher entry of data specifying a level of QoS adjustment for communication devices located within the specified emergency response zone. As shown in the depicted embodiment, QoS entry object 324 comprises a drop-down menu-list of pre-specified QoS level options from which the dispatch may select and enter. The QoS level specified in QoS entry object 324 is location/area specific rather than being specific to individual communication devices carried and utilized by emergency responders.

GUI 300 further provides means for a dispatcher to specify the identity of emergency responders including vehicles and emergency communication devices, and to request specified QoS levels therefore. Specifically, a DISPATCH_RESOURCE_CLASSES entry object 314 provides a dispatcher a selectable menu-list of emergency response providers (e.g. ambulatory, police, etc.) that are available in accordance with responder data retrieved from a database such as dispatch database 242 depicted in FIG. 2. Further pull-down menus are then available for selectively specifying a type of vehicle per service provider and finally specify a list of individual vehicles within the vehicle type category. For example, selection of the depicted "Ambulatory" emergency response provider type results in a listing of "Ground Carrier" and "Helicopter" as the available vehicle types available. Further selection of "Ground Carrier" results in a listing of the particular vehicles identified by the depicted codes V1A, V2A and T1FR.

GUI 300 further comprises a data entry object 316 for specifying QoS levels for communication devices used by emergency responders. Object 316 is illustrated in a tabular format having columnar designations such that in each row-wise record a communication device, such as a radio, is associated with a specified vehicle. For example, the vehicles V1A (designating a particular ambulance van) and T1FR (designating a particular fire and rescue truck), may be entered into table object 316 via selection of the vehicles using object 314. Once entered, one or more records corresponding to each vehicle may appear in table object 316 in accordance with how many communication devices are contained in each vehicle. In the depicted example, two records are generated for V1A—one designating a radio and the other designating a video camera as the communication devices.

Within each record of table object 316 is a column wise QoS specification entry and a response zone/path entry field. Similar to field 324 within zone select object 308, the QoS entry field in each record of table object 316 enables the dispatcher to enter a value specifying a desired QoS level for the particular communication device specified by the record. For example, the second row wise record specifies a QoS level of "high" for the video camera within emergency vehicle V1A. The final column wise entry in each record specifies an area (zone) corresponding to a path that the vehicle is predicted or otherwise likely to take while traveling to and/or from the emergency event site. Such path routing data may be specified by the dispatcher manually or as aided by a map tool that enables the dispatcher to find and specify the likely path zone on a geographic/geopolitical map. In one embodiment, object 316 generates the map in accordance with endpoint specifications by the dispatcher (dispatcher specifies event site and hospital, for example).

Figure 4:
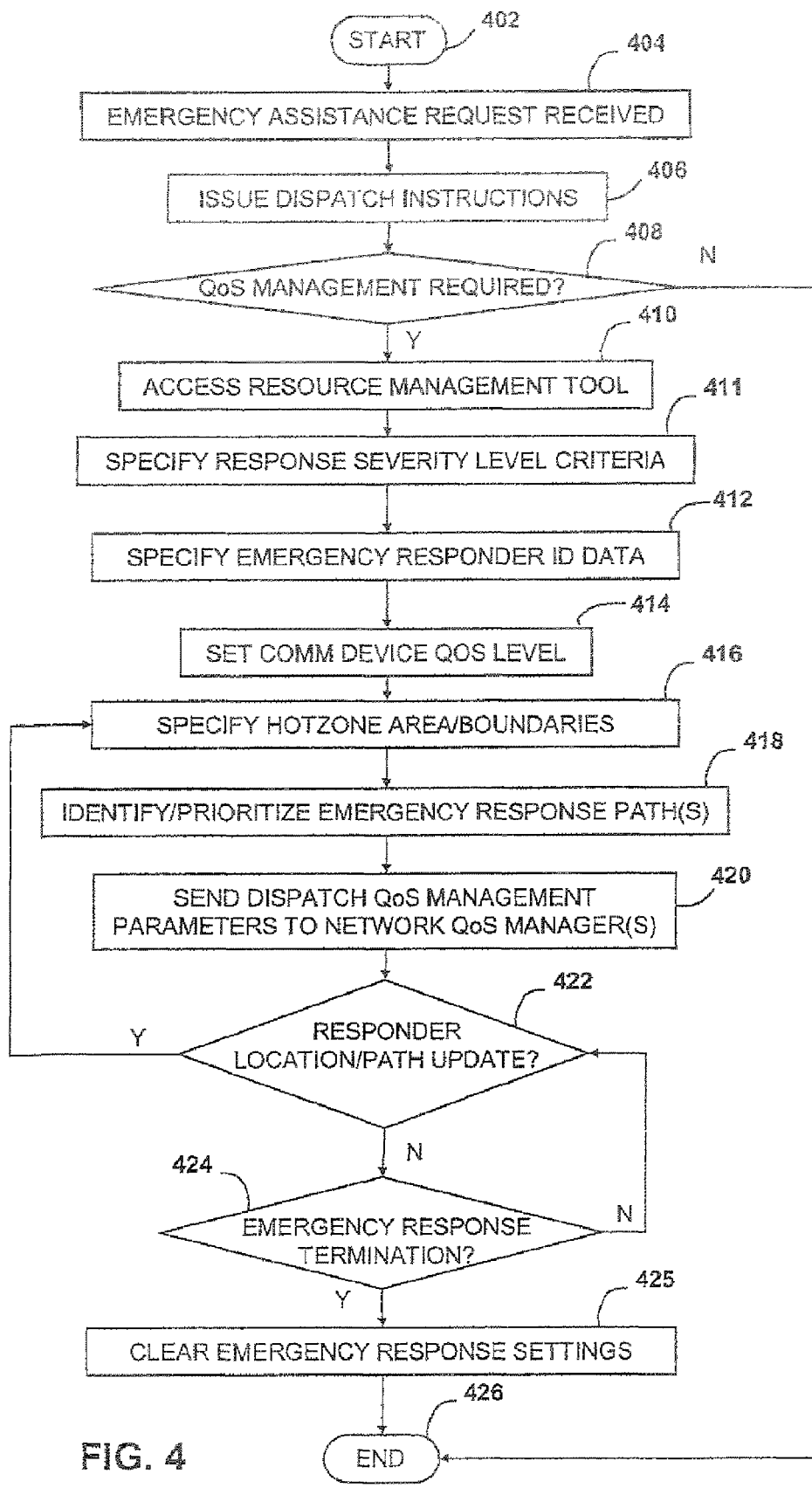
FIG. 4 is a high-level flow diagram illustrating steps performed by an emergency dispatcher responsive to an emergency dispatch notification.

FIG. 4 is a high-level flow diagram illustrating steps performed by an emergency dispatcher responsive to an emergency dispatch notification in accordance with one embodiment of the present invention. The process begins as shown at steps 402 and 404 with an emergency call being received by the dispatcher. Typically, the emergency call may be received from an MRU such as one of MRUs 114, 116, or 118, or may be received from the public such as in the case of an emergency 911 call. In any case, the emergency call preferably provides the dispatcher with information describing the nature of the emergency event and its location. As depicted at step 406, the automated and/or human dispatcher utilizes the received emergency event information which describe the nature of the event and its location to issue dispatch instructions to MRUs.

If the dispatcher determines that no adjustment to communication resources access is required in responding to the emergency, the dispatch process continues until the emergency has been handled and the process ends as shown at steps 408 and 426. If, however, in accordance with a human or automated decision that access to communication resources should be managed in response to the emergency notification (step 408), the dispatcher accesses QoS management tools as depicted at step 410. In one embodiment, the dispatcher may activate and begin entering information into an emergency response GUI such as that depicted and described above with reference to FIG. 3. As part of the QoS management specification, the dispatcher specifies a severity level of the event such as via SEVERITY data entry object 312 (step 411) and further specifies the emergency responder identification data such as via DISPATCH_RESOURCE_CLASSES entry object 314 (step 412).

Proceeding as shown at step 414, the dispatcher enters the communication device QoS levels such as via object 316. As part of specifying the QoS levels for the communication devices using object 316, the dispatcher specifies the affected zone area such as by using a map tool and identifies and prioritizes the likely emergency response paths that may be traveled by the specified emergency responders (steps 416 and 418).

After entering the responder, event zone, and QoS data, the dispatcher uses the user interface application to send the specified data in the form of a QoS allocation request to a QoS manager such as QoS manager 215 which implements the request using available resources (step 420). As shown at steps 422 and 416, the emergency responders may provide location and event update information to the dispatcher who may respond by adjusting and resending the QoS allocation request. Such updates preferably include adaptively modifying the specified area defining the emergency response zone in accordance with event data received from emergency responders.

The foregoing process continues to address the dynamic field conditions until an automated and/or human determination that the emergency response is to be terminated as shown at step 424. Responsive to such a determination, the emergency response settings as entered into the user interface and received and implemented by the QoS manager are cleared and the system is reset to its pre-emergency response state (step 425). In one embodiment, one or more modules within the emergency response system such as QoS adjust module 240 performs a system status checkpoint to determine and record the present QoS settings at the time QoS adjustment and resource allocation as described in the foregoing steps is commenced. The recorded QoS settings are then used upon termination of the QoS adjustment sequence to restore the pre-emergency QoS settings at step 425. Following restoration of the pre-emergency response QoS settings the process terminates as shown at step 426.

Figure 5:
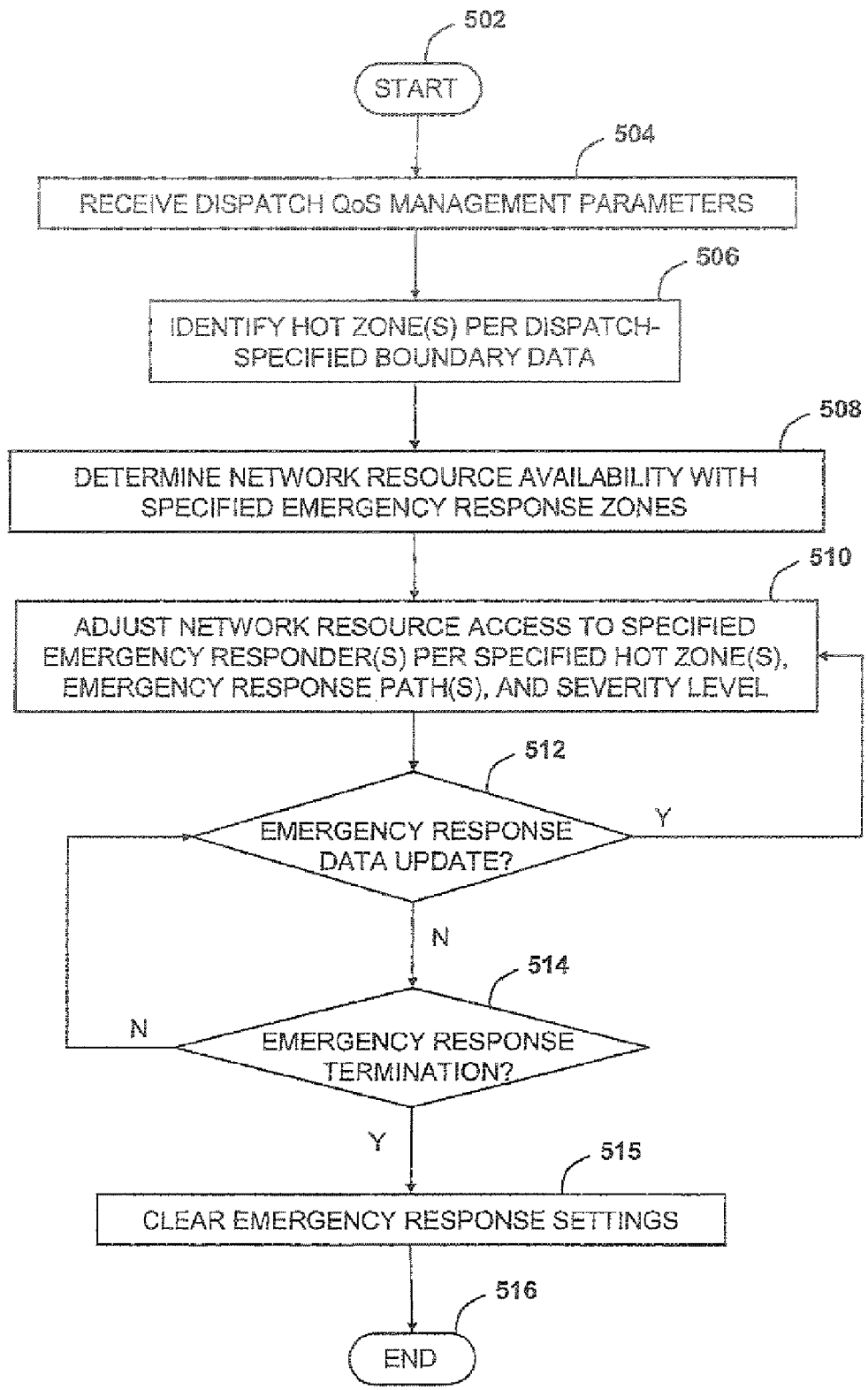
FIG. 5 is a high-level flow diagram depicting steps performed during emergency dispatch QoS management in accordance with one embodiment of the present invention.

FIG. 5 is a high-level flow diagram depicting steps performed such as by QoS manager 215 during emergency dispatch QoS management in accordance with one embodiment of the invention. The process begins as shown at steps 502 and 504 with QoS manager 215 receiving the QoS management parameters included in the QoS request formulated and sent as shown in FIG. 4. Responsive to receiving the request, QoS manager 215 identifies the one or more emergency response zones specified by the request and determines network resource availability for the specified zone(s) (steps 506 and 508).

QoS manager 215 adjusts network resource access of the specified emergency responder communication devices in accordance with one or more of the QoS management parameters received in the request. Namely, the QoS levels for the communication devices may be set in accordance with the location and/or likely travel path of the device (i.e., location-specific QoS adjustment) as well as the severity level and type of communication device (step 510). As shown at steps 512 and 510, the QoS levels and corresponding access to network communication resources are preferably dynamically adjusted in accordance with feedback from the dispatcher node which receives updates from the field responders and continues until the emergency response is determined to have terminated as shown at step 514.

Upon determining that the emergency response has terminated, the emergency response QoS settings as received from the dispatcher and/or implemented by the QoS manager are cleared and the pre-emergency settings restored as illustrated at step 515. In one embodiment, one or more modules within the emergency response system such as QoS manager 215 performs a system status checkpoint to determine and record the present QoS settings at the time QoS adjustment and resource allocation as described in the foregoing steps is commenced. The recorded QoS settings are then used upon termination of the QoS adjustment sequence to restore the pre-emergency QoS settings at step 515. Following restoration of the pre-emergency response QoS settings the process terminates as shown at step 516.

Figure 6:
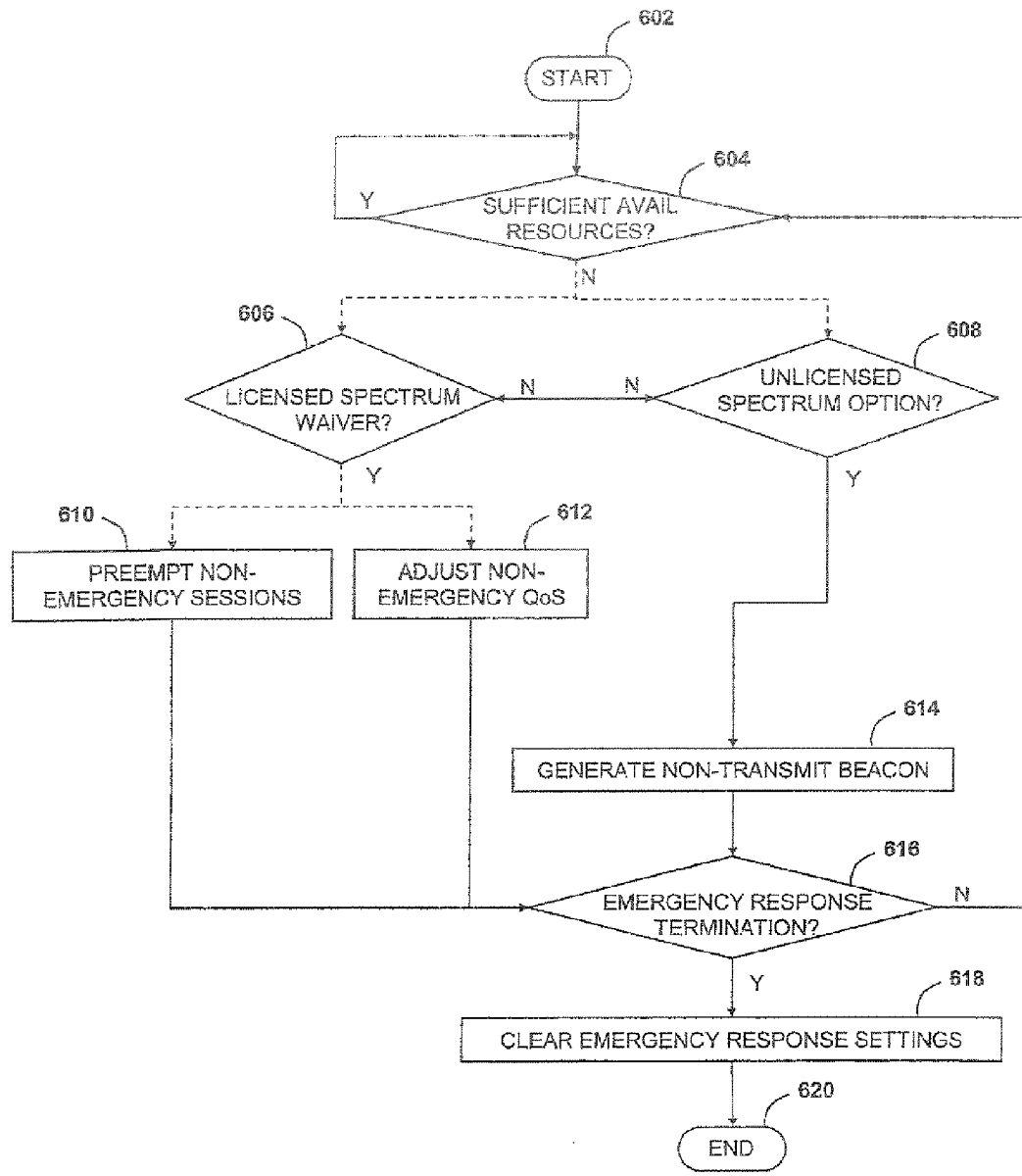
FIG. 6 is a high-level flow diagram illustrating steps performed by emergency dispatch QoS management to facilitate allocation of network resources to emergency responders in accordance with one embodiment of the present invention.

FIG. 6 is a high-level flow diagram illustrating steps performed by emergency dispatch QoS management to facilitate allocation of network resources to emergency responders such as illustrated at steps 508 and 510 of FIG. 5. The process begins as shown at steps 602 and 604 with a QoS management module such as QoS manager 215 determining whether sufficient network resources are presently free (i.e., not allocated or otherwise reserved) for allocation to satisfy the QoS adjustment request sent by the dispatcher.

Responsive to determining that presently available resources are insufficient to accommodate the QoS allocation request, the QoS manager may re-allocate network bandwidth/channel resources using either licensed spectrum (step 606) and/or unlicensed spectrum (step 608). Responsive to licensed spectrum availability (step 606), the QoS manager may preempt currently active communication sessions (step 610) and/or may adjust the QoS priority allocated to non-emergency users having access to resources in the specified emergency response zone (step 612). The QoS adjustment option depicted at step 612 may include lowering the QoS priority level of non-emergency responders using a specified bandwidth to, for example, a "best effort," or other level that is a reduced QoS level than has been commercially or otherwise allocated.

The preemption option illustrated at step 610 may include termination of active sessions presently utilizing a specified portion of licensed bandwidth and allocation/reservation of the bandwidth to dispatched emergency responders. In one embodiment in which the specified response zone is included in a multi-carrier wireless communication coverage area, the preemption may include emergency waiver-based carrier allocation. For example, waiver-based multi-carrier operation may be imposed within the response zone in which an additional carrier is allocated to be accessible by communication devices within the specified response zone.

In addition or as an alternative to reallocation of licensed spectrum, the QoS manager may allocate/reallocate unlicensed spectrum in the manner illustrated beginning at step 608. As depicted at step 614, the QoS manager initiates generation and transmission of a beacon in the specified emergency response zone. The beacon is encoded to communicate to users and prospective users of one or more portions of unlicensed spectrum that an emergency condition has been declared and that access to the specified unlicensed spectrum has been limited for non-emergency users, that is, that use of the spectrum by non-emergency users is to be terminated or that use of the available spectrum by non-emergency users is to be limited to, for example, a best effort QoS level of service. The beacon may be transmitted locally within the specified emergency response zone or along specified emergency travel routes or may be transmitted remotely such as from public utility infrastructure such as lighting, radio, and/or cell transmission towers.

The network resource allocation/adjustment as illustrated in the foregoing steps continues until the QoS manager determines that the emergency response sequence has terminated (step 616) and emergency response settings are cleared (step 618) as previously described with reference to FIG. 5 and the process ends (step 620).

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for adaptively allocating shared communication resources in response to an emergency event, said method comprising:
   identifying a response zone associated with an emergency event; and
   dispatching emergency responders having communication devices to said response zone, wherein said dispatching includes adjusting access of said communication devices to shared communications resources, said adjusting access including:
      identifying one or more of said emergency responder communication devices to be dispatched to the identified response zone;
      specifying a quality of service (QoS) priority level of at least one of said one or more of said identified emergency responder communication devices; and
      specifying a QoS priority level for communication devices located within said identified response zone.

2. The method of claim 1, wherein said identified response zone is included in a multi-carrier wireless communication coverage area, said method further comprising, responsive to said specifying a QoS priority level of communication devices located within said identified response zone, imposing waiver-based multi-carrier operation within said identified response zone wherein an additional carrier is allocated to be accessible by communication devices within said identified response zone.

3. The method of claim 1, wherein said adjusting accessibility to shared communications resources further includes:
   identifying a travel route for at least one of said dispatched emergency responders; and
   including areas traversed by said travel route within said identified response zone.

4. The method of claim 1, wherein said identifying a response zone associated with an emergency event comprises:
   responsive to receiving an indication of an emergency event, specifying an area defining said response zone; and
   adaptively modifying the specified area in accordance with event data received from emergency responders.

5. The method of claim 1, further comprising:
   determining network resource availability within said identified response zone; and;
   adjusting access of at least one of said one or more of said identified emergency responder communication devices to network resources in accordance with:
      said identified response zone;
      said specified QoS priority level of at least one of said one or more of said identified emergency responder communication devices; and said determined network resource availability within said identified response zone.

6. The method of claim 1, further comprising:
recording QoS settings data for communication devices prior to said adjusting access of said communication devices to shared communication resources;
clearing QoS settings associated with said adjusted access; and
restoring said recorded QoS settings data.

7. The method of claim 1, wherein said adjusting access of said communication devices to shared communications resources further comprises generating a no-transmit beacon encoded to communicate that of one or more portions of unlicensed spectrum within said response zone has limited access for non-emergency responders.

8. An apparatus for adaptively allocating shared communication resources in response to an emergency event, said apparatus comprising a resource allocation manager that is adapted to identify a response zone associated with an emergency event and dispatch emergency responders having communication devices to said response zone, wherein said dispatching includes adjusting access of said communication devices to shared communications resources and wherein said adjusting access includes identifying one or more of said emergency responder communication devices to be dispatched to the identified response zone, specifying a quality of service (QoS) priority level of at least one of said one or more of said identified emergency responder communication devices, and specifying a QoS priority level for communication devices located within said identified response zone.

9. The apparatus of claim 8, wherein said identified response zone is included in a multi-carrier wireless communication coverage area and wherein said resource allocation manager further is adapted to, responsive to said specifying a QoS priority level of communication devices located within said identified response zone, impose waiver-based multi-carrier operation within said identified response zone wherein an additional carrier is allocated to be accessible by communication devices within said identified response zone.

10. The apparatus of claim 8, wherein said resource allocation manager further is adapted to adjust accessibility to shared communications resources by identifying a travel route for at least one of said dispatched emergency responders and including areas traversed by said travel route within said identified response zone.

11. The apparatus of claim 8, wherein said resource allocation manager is adapted to identify a response zone associated with an emergency event by, responsive to receiving an indication of an emergency event, specifying an area defining said response zone and adaptively modifying the specified area in accordance with event data received from emergency responders.

12. The apparatus of claim 8, further comprising a QoS manager that is adapted to determine network resource availability within said identified response zone and adjust access of at least one of said one or more of said identified emergency responder communication devices to network resources in accordance with said identified response zone, said specified QoS priority level of at least one of said one or more of said identified emergency responder communication devices, and said determined network resource availability within said identified response zone.

13. The apparatus of claim 8, wherein said resource allocation manager further is adapted to record QoS settings data for communication devices prior to said adjusting access of said communication devices to shared communication resources, clear QoS settings associated with said adjusted access, and restore said recorded QoS settings data.

14. The apparatus of claim 8, wherein said resource allocation manager is adapted to adjust access of said communication devices to shared communications resources by generating a no-transmit beacon encoded to communicate that of one or more portions of unlicensed spectrum within said response zone has limited access for non-emergency responders.

15. The method of claim 1, wherein identifying the response zone comprises defining physical characteristics of the response zone after having received an indication of the emergency event.

16. The method of claim 15, wherein defining the physical characteristics of the response zone comprises setting the response zone using a map tool.

17. The method of claim 15, wherein defining the physical characteristics of the response zone comprises setting a radius of the response zone.

18. The method of claim 15, further comprising modifying the physical characteristics of the response zone in accordance with event data received from the emergency responders after the emergency responders have been notified of the emergency event.

19. The method of claim 1, wherein specifying QoS priority level of at least one of the one or more of said identified emergency responder communication devices and for communication devices located within the identified response zone comprises setting the QoS priority level of each communication device in accordance with a location of the communication device, a likely travel path of the communication device, a type of the communication device, and a severity level of the emergency event.

* * * * *